(12) United States Patent
Kugler

(10) Patent No.: US 7,058,365 B2
(45) Date of Patent: Jun. 6, 2006

(54) BUSINESS CARD WITH INTEGRATED PAPER CELL PHONE

(75) Inventor: Brett E. Kugler, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 534 days.

(21) Appl. No.: 09/895,702

(22) Filed: Jun. 29, 2001

(65) Prior Publication Data
US 2003/0003954 A1   Jan. 2, 2003

(51) Int. Cl.
H04B 1/38 (2006.01)

(52) U.S. Cl. .............. 455/90.3; 455/565; 455/575.3; 455/90.2; 455/572; 455/562.1; 455/564; 174/254; 174/256; 174/268; 361/749; 361/761

(58) Field of Classification Search ............ 455/550.1, 455/558, 405, 407, 575.1, 575.7, 565, 575.3, 455/90.2, 572, 562.1, 564; 174/254, 256, 174/268; 361/749, 761; 156/265, 277, 278, 156/257; 381/431

See application file for complete search history.

(56) References Cited

U.S. PATENT DOCUMENTS

| | | | |
|---|---|---|---|
| 5,652,043 A | | 7/1997 | Nitzan |
| 5,811,204 A | | 9/1998 | Nitzan |
| 5,845,218 A | | 12/1998 | Altschul |
| 5,875,393 A | * | 2/1999 | Altschul et al. ............ 455/407 |
| 5,897,522 A | | 4/1999 | Nitzan |
| 5,933,783 A | * | 8/1999 | Kawakami et al. ......... 455/566 |
| 5,965,848 A | * | 10/1999 | Altschul et al. ............ 174/254 |
| 5,983,094 A | | 11/1999 | Altschul et al. |
| 6,019,865 A | * | 2/2000 | Palmer et al. .............. 156/265 |
| 6,061,580 A | | 5/2000 | Altschul et al. |
| 6,144,847 A | | 11/2000 | Altschul et al. |
| 6,317,086 B1 | * | 11/2001 | Woo ........................... 343/702 |
| 6,868,314 B1 | * | 3/2005 | Frink .......................... 701/3 |

OTHER PUBLICATIONS

Stephen Mraz, "Thin Flexible Battery Needs No Case", Mar. 1, 2001, Machine Design, p. 1.*
Dorit.Com/Web Productions(1999). Power Paper [online] Available: http://www.powerpaper.com/indexVer4a.html (Jun. 21, 2001).
Bonsor, Kevin (2001). How Disposable Cell Phones Work [online] Available: http://www.howstuffworks.com/disposable-cell-phone.htm?printable=1 (Jun. 21, 2001).

* cited by examiner

Primary Examiner—Joseph Feild
Assistant Examiner—Randy Peaches

(57) ABSTRACT

A disposable cellular telephone and business card combination. The cellular telephone circuit is printed on a paper substrate with a conductive ink. A paper microphone diaphragm is attached to one end of the business card and a paper speaker diaphragm is attached to an opposite end of the business card. The microphone and speaker diaphragms are electrically coupled to the circuit, and are attached to the paper substrate in any suitable manner that allows them to vibrate relative thereto. A thin flexible battery cell is formed in the paper substrate at any suitable location so that it doesn't interfere with the position of the circuit, microphone or speaker. A filament antenna is formed in the business card so that it can be extracted therefrom when using the card as a cellular telephone. A switch is provided on the business card that when activated causes a predetermined number to be dialed associated with the text on the business card.

15 Claims, 1 Drawing Sheet

BUSINESS CARD WITH INTEGRATED PAPER CELL PHONE

BACKGROUND OF THE INVENTION

1. Field of the Invention

This invention relates generally to a disposable cellular telephone and, more particularly, to a disposable cellular telephone that is incorporated into a business card using paper technologies.

2. Discussion of the Related Art

As electronics technology advances, electronic devices are generally manufactured in a more cost effective manner so that certain devices can be designed to be disposable. For example, it is known in the art to manufacture cellular telephones and pagers by a process where electrical circuits and related components are patterned and formed on inexpensive substrates, such as paper, making the cellular telephone or pager inexpensive and readily disposable.

U.S. Pat. No. 5,965,848 discloses such a disposable cellular telephone and pager. This patent describes a process whereby a strip of a flexible and inexpensive material is printed with a circuit trace in a desirable pattern for a telephone circuit. The strip of material is then folded upon itself to give the cell phone or pager the desired rigidity. The folded assembly is punched to form recesses therein for holding those electrical components that cannot be formed by conductive traces. Additionally, certain integrated circuits that are relatively thin can be deposited on the substrate and be interconnected with the circuit traces in a desirable manner. The folded assembly is then covered with a protective coating, and various other components, such as a key-pad, microphone, speaker and battery are attached to the folded assembly and connected to the circuit in a well known manner.

As electronics technology continues to advance, more of the electrical components that go into cellular phones can be made thinner, smaller and more readily disposable.

SUMMARY OF THE INVENTION

In accordance with the teachings of the present invention, a disposable cellular telephone and business card combination is disclosed. The cellular telephone circuit is printed on a paper substrate with a conductive ink. A paper microphone diaphragm is attached to one end of the business card and a paper speaker diaphragm is attached to an opposite end of the business card. The microphone and speaker diaphragms are electrically coupled to the circuit, and are attached to the paper substrate in any suitable manner that allows them to vibrate relative thereto. A thin battery cell is formed in the paper substrate at any suitable location so that it doesn't interfere with the position of the circuit, microphone or speaker. A filament antenna can be formed in the business card so that it can be extracted therefrom when using the card as a cellular telephone. A switch is provided on the business card that when activated causes a predetermined number to be dialed associated with the text on the business card.

Additional objects, advantages, and features of the present invention will become apparent from the following description and appended claims, taken in conjunction with the accompanying drawings.

DETAILED DESCRIPTION OF THE EMBODIMENTS

The following discussion of the embodiments of the invention directed to a business card and cellular telephone combination is merely exemplary in nature, and is in no way intended to limit the invention or its application or uses. For example, the discussion below describes the cellular telephone as being part of a standard business card. However, the invention described herein can be used for disposable cards combined with cellular telephones other than business cards.

Figure 1:
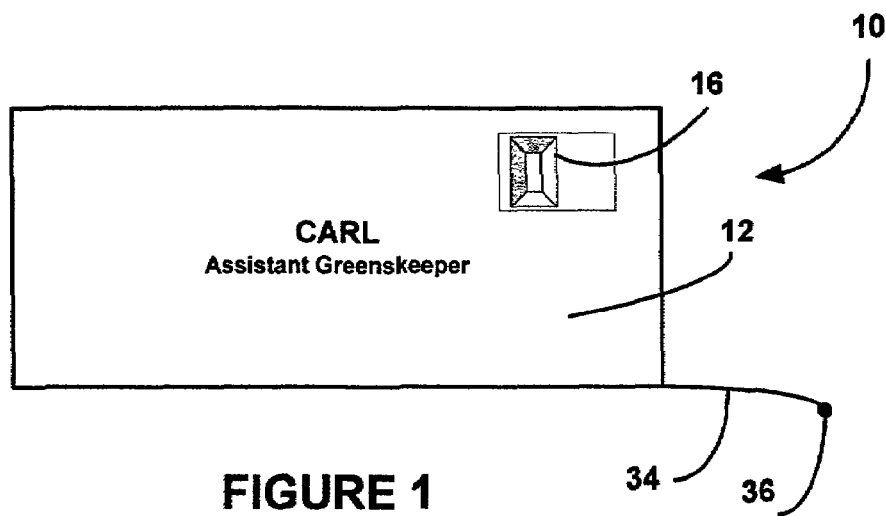
FIG. 1 is a front view of a combination cellular telephone and business card, according to an embodiment of the present invention.
Figure 2:
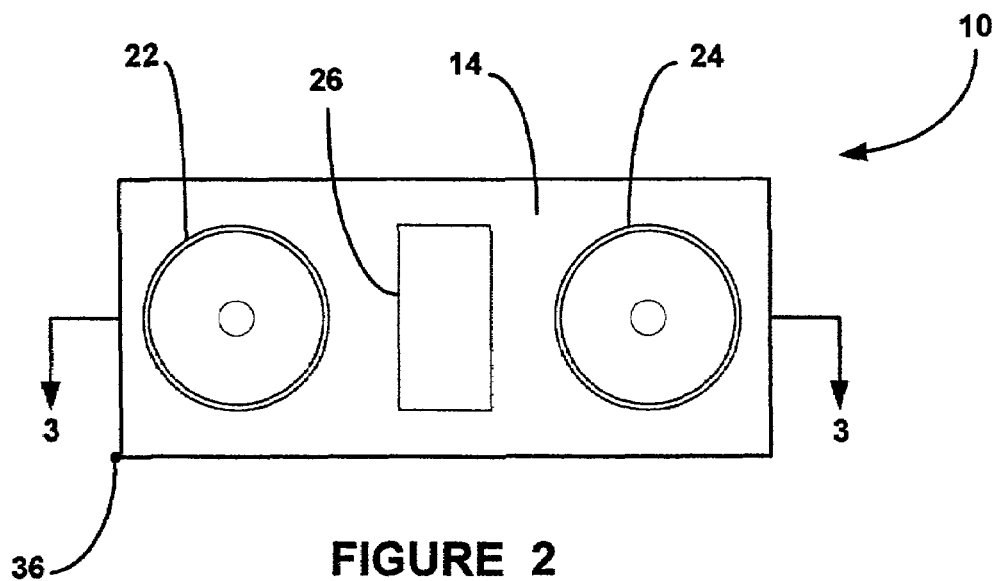
FIG. 2 is a back view of the business card cellular telephone shown in FIG. 1.
Figure 3:
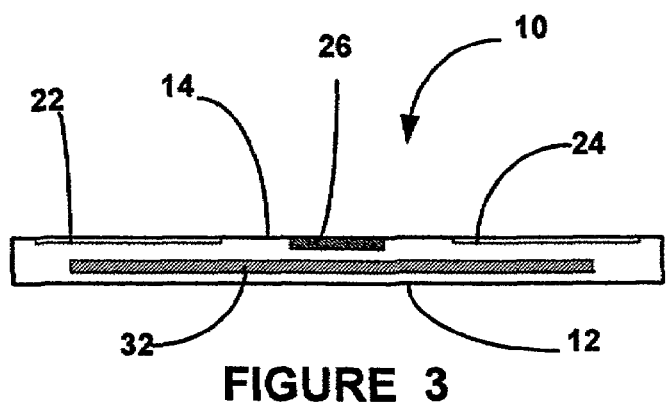
FIG. 3 is a cross-sectional view of the business card cellular telephone shown in FIG. 1.

FIG. 1 is a front view, FIG. 2 is back view and FIG. 3 is a cross-sectional view through line 3—3 of FIG. 2 of a business card 10 including a cellular telephone, according to the invention. In one embodiment, the business card 10 is the standard length and width (3.5"×2") typically used in the industry. However, different size cards can also be used within the scope of the present invention. Further, the thickness of the business card 10 may vary from design to design, or vary from the standard business card thickness, to be able to accommodate the various components of the cellular telephone, as will be discussed below. Further, it is envisioned that the business card 10 is made out of a durable and flexible paper material suitable for known business cards, where the various electrical circuits of the phone are patterned thereon by suitable technologies.

In this embodiment, the business card 10 is intended to be used to only place outgoing calls, where the cellular telephone will automatically call the number associated with the person or business on the business card 10. In other words, by activating the cellular telephone associated with the business card 10, the card 10 will automatically call a predetermined number, where the user can then talk to the person who is called. Thus, the cellular telephone will not have its own call number, alleviating those concerns associated with the limitations of assigning numbers to a disposable telephone. Additionally, the card 10 will not have a key-pad for dialing an outgoing number. The cellular telephone can have a one-time use, or can be a multiple use phone, where the phone can be activated more than once to call the same number.

The business card 10 includes a front surface layer 12 and a back surface layer 14 that are two sides of the same paper substrate, or possibly separate paper layers laminated together. In this embodiment, an activation switch 16 is formed on the front surface layer 12 at any suitable location, and is a special slidable-type switch that activates the call, instead of a push-type button switch that can be inadvertently activated. The front surface layer 12 also includes the usual information of the owner of the card, including any type of writing or embossing typically found on business cards.

In this embodiment, the business card 10 includes an input diaphragm 22, acting as the microphone of the telephone, formed on the back surface layer 14 at one end of the card 10, and an output diaphragm 24, acting as the speaker or earphone, formed on the back surface layer 14 at an opposite end of the card 10, as shown. Both the input diaphragm 22 and the output diaphragm 24 are paper diaphragms attached to the back layer 14 by any suitable device or technique that will allow them to vibrate in response to electrical signals relative to the substrate of the card 10. Paper speaker technology of this type exists in the art, and can be miniaturized for the purposes described herein. In an alternate embodiment, the diaphragms 22 and 24 can be piezoelectric films, known in the art, that vibrate in response to an electrical signal or an acoustical signal.

Additionally, paper battery technology exists for thin battery cells laminated within a paper substrate. A battery 26 based on this technology is also formed in the back layer 14 between the input diaphragm 22 and the output diaphragm 24, as shown. U.S. Pat. No. 5,811,204 discloses a flexible, electrochemical cell for providing battery power, where the cell is made up of a plurality of pole layers, that is suitable for the battery 26. The battery 26 is located at this position for convenience, however, in other embodiments the battery 26 can be moved to other locations to conform with the configuration and structure of the business card 10. The battery 26 would hold enough power for a call of a predetermined duration. Thus, the size of the battery 26 can be selected for that duration.

A printed integrated electrical circuit 32 for the cellular telephone is formed on either the front layer 12 or the back layer 14. The circuit 32 is printed on one of the layers 12 or 14 in any suitable manner, such as disclosed in the '848 patent, and the other layer 12 or 14 is formed over the printed circuit 32 to provide protection. In one embodiment, the circuit 32 is formed by patterning a conductive ink on the paper layer. An electrical circuit suitable for a cellular telephone of the type described herein can be used. One example can be found in U.S. Pat. No. 5,875,393. Special electrical connections (not shown) between the circuit 32 and the battery 26, between the circuit 32 and the input and the output diaphragms 22 and 24, and between the circuit 32 and the switch 26 are provided to make the cellular telephone operational. Because the printed circuit 32 can be made flexible, the combination of the circuit 32 and the layers 12 and 14 could be made in a manner for normal business card use.

The cellular telephone business card 10 also includes a filament antenna 34 formed within the layers 12 and 14, and electrically coupled to the printed circuit 32 in any suitable manner to provide an antenna for the cellular telephone. In this embodiment, the antenna 34 includes an end nub 36 that allows the antenna 34 to be retracted from the business card 10, as shown. The antenna 34 is shown extracted in FIG. 1 and retracted in FIG. 2. In other embodiments, the filament antenna 34 can be permanently secured within the card 10 to provide the antenna function.

The foregoing discussion discloses and describes merely exemplary embodiments of the present invention. One skilled in the art will readily recognize from such discussion, and from the accompanying drawings and claims, that various changes, modifications or variations can be made therein without departing from the spirit and scope of the invention as defined in the following claims.

What is claimed is:

1. A cellular telephone comprising:
   a paper substrate;
   a printed circuit patterned on the paper substrate with conductive ink;
   a switch formed on the paper substrate and electrically coupled to the circuit;
   a paper input diaphragm electrically coupled to the circuit, said input diaphragm being formed to the paper substrate in such a manner that allows the input diaphragm to vibrate relative thereto;
   a paper output diaphragm electrically coupled to the circuit, said output diaphragm being formed to the paper substrate in such a manner that allows the output diaphragm to vibrate relative thereto; and
   a battery electrically coupled to the circuit and formed in the paper substrate, said battery being made from paper technologies, said switch being activated to cause the cellular telephone to call a predetermined number.

2. The cellular telephone according to claim 1 wherein the paper substrate has a length of about 3.5 inches and a width of about 2 inches.

3. The cellular telephone according to claim 1 wherein the paper substrate is a business card including writing thereon.

4. The cellular telephone according to claim 1 further comprising a filament antenna, said filament antenna being formed in an edge of the paper substrate.

5. The cellular telephone according to claim 4 wherein the antenna includes a nub at one end, said nub being operable to extract the antenna from the substrate.

6. The cellular telephone according to claim 1 wherein the switch is a slidable switch.

7. A paper business card comprising:
   a paper substrate having a front surface layer and a back surface layer, said paper substrate including writing on the front layer;
   a printed circuit patterned on the paper substrate with conductive ink;
   a switch electrically coupled to the circuit;
   a paper microphone diaphragm electrically coupled to the circuit, said microphone diaphragm being attached to the paper substrate in such a manner that allows the microphone diaphragm to vibrate relative thereto;
   a paper speaker diaphragm electrically coupled to the circuit, said speaker diaphragm being attached to the paper substrate in such a manner that allows the speaker diaphragm to vibrate relative thereto; and
   a battery electrically coupled to the circuit and formed in the paper substrate, said battery being made from paper technologies, said switch being activated to cause the business card to call a predetermined number.

8. The card according to claim 7 further comprising a filament antenna, said filament antenna being formed in an edge of the paper substrate.

9. The card according to claim 8 wherein the antenna includes a nub at one end, said nub being operable to extract the antenna from the substrate.

10. The card according to claim 7 wherein the switch is a slidable switch.

11. The card according to claim 7 wherein the paper substrate has a length of about 3.5 inches and a width of about 2 inches.

12. The card according to claim 7 wherein the switch is formed on the front layer and the microphone and speaker diaphragms are formed on the back layer.

13. A method of making a disposable cellular telephone, comprising:
    providing a paper substrate;
    patterning a circuit on the substrate using conductive ink;
    attaching a paper input diaphragm to the substrate in a manner that allows the input diaphragm to vibrate relative thereto;
    attaching a paper output diaphragm to the substrate in a manner that allows the output diaphragm to vibrate relative thereto; and
    forming a battery within the substrate, said battery being made from paper technologies.

14. The method according to claim 13 wherein the paper substrate is a business card having writing thereon.

15. The method according to claim 13 further comprising attaching a filament antenna to the substrate.

* * * * *